(12) United States Patent
Reynolds et al.

(10) Patent No.: US 7,363,199 B2
(45) Date of Patent: Apr. 22, 2008

(54) METHOD AND APPARATUS FOR SIMULATING SOFT OBJECT MOVEMENT

(75) Inventors: Hugh Reynolds, Dublin (IE); Andrew Bond, Dublin (IE); Andrew Bowell, Dublin (IE)

(73) Assignee: Telekinesys Research Limited (IE)

( * ) Notice: Subject to any disclaimer, the term of this patent is extended or adjusted under 35 U.S.C. 154(b) by 667 days.

(21) Appl. No.: 10/128,374

(22) Filed: Apr. 24, 2002

(65) Prior Publication Data

US 2002/0180739 A1 Dec. 5, 2002

(30) Foreign Application Priority Data

Apr. 25, 2001 (EP) .................... 01650045

(51) Int. Cl.
*G06F 17/10* (2006.01)

(52) U.S. Cl. .............. 703/2; 703/16; 703/17; 716/20

(58) Field of Classification Search .......... 703/2, 703/6–7, 16–17

See application file for complete search history.

(56) References Cited

U.S. PATENT DOCUMENTS

| | | | | |
|---|---|---|---|---|
| 5,947,981 | A * | 9/1999 | Cosman ................ | 606/130 |
| 6,167,145 | A * | 12/2000 | Foley et al. ............ | 382/128 |
| 6,212,442 | B1 * | 4/2001 | Andersson et al. ...... | 700/194 |
| 6,509,899 | B1 * | 1/2003 | Anderson .............. | 345/473 |
| 6,714,901 | B1 * | 3/2004 | Cotin et al. ............ | 703/7 |
| 6,909,431 | B1 * | 6/2005 | Anderson et al. ........ | 345/473 |
| 6,947,879 | B2 * | 9/2005 | Yamada et al. .......... | 703/2 |
| 6,958,752 | B2 * | 10/2005 | Jennings et al. ......... | 345/420 |
| 2002/0180739 | A1 | 12/2002 | Reynolds et al. ........ | 345/474 |
| 2002/0183992 | A1 * | 12/2002 | Ayache et al. .......... | 703/2 |
| 2003/0112281 | A1 * | 6/2003 | Sriram et al. ........... | 345/958 |
| 2004/0148268 | A1 | 7/2004 | Reil | |
| 2004/0220793 | A1 | 11/2004 | Hawkes et al. | |
| 2005/0075154 | A1 | 4/2005 | Bordes et al. | |
| 2005/0075849 | A1 | 4/2005 | Maher et al. | |
| 2005/0086040 | A1 | 4/2005 | Davis et al. | |
| 2005/0162433 | A1 | 7/2005 | Tonge et al. | |
| 2005/0165873 | A1 | 7/2005 | Zhang et al. | |
| 2005/0165874 | A1 | 7/2005 | Zhang et al. | |
| 2005/0251644 | A1 | 11/2005 | Maher et al. | |
| 2006/0100835 | A1 | 5/2006 | Bordes et al. | |
| 2006/0106591 | A1 | 5/2006 | Pierre et al. | |
| 2006/0149516 | A1 | 7/2006 | Bond et al. ............. | 703/6 |

OTHER PUBLICATIONS

He et al. teaches a collision detection for volumetric objects (IEEE 1997).*

Hervé Delingette teaches a toward realistic soft-tissue modeling in medical simulation (IEEE 1998).*

(Continued)

*Primary Examiner*—Paul Rodriguez
*Assistant Examiner*—Andre Pierre-Louis
(74) *Attorney, Agent, or Firm*—Kirkpatrick & Lockhart Preston Gates Ellis LLP (57) ABSTRACT

Movement of a soft body is simulated by defining its surface as an arbitrary mesh of points connected by edges. Each point is represented as a point mass, subject to conventional laws of motion. The simulator represents forces acting on the point masses, namely skin forces connecting pairs of point masses and volumetric forces for maintaining relative positions with no net linear or rotational forces on the soft body.

18 Claims, 8 Drawing Sheets

OTHER PUBLICATIONS

Güdükbay et al, Computer Aided Design, vol. 26, No. 12, pp. 868-875, Animation of Deformable Models, Dec. 1, 1994.

Terzopoulos et al, IEEE Computer Graphics & Applns., vol. 8, No. 6, pp. 41-51, Physically Based Models With . . . , Nov. 1, 1988.

van den Bergen, (1998), "Efficient Collision Detection of Complex Deformable Models using AABB Trees," *Journal of Graphic Tools*, 2:1-13.

Larsen, (1998), "Minkowski Sums and Distance Computation".

van den Bergen, (1999), "A Fast and Robust GJK Implementation for Collision Detection of Convex Objects," *Journal of Graphic Tools*, 4:7-25.

Ehmann et al., (2000), "SWIFT: Accelerated Proximity Queries Using Multi-Level Voronoi Marching," Technical Report: TR00-026, University of North Carolina at Chapel Hill, 21 pages.

Ehmann et al., (2000), "Accelerated Proximity Queries Between Convex Polyhedra By Multi-Level Voronoi Marching," *Intelligent Robots and Systems*, 3:2101-2106.

van den Bergen, (1996), "Proximity Queries and Penetration Depth Compution on 3D Game Ojects," *Technology*, pp. 125-131.

Sweeney et al., Proc. of the Winter Simulation Conf., vol. Conf. 23, "Modelling Physical Objects for Simulation," pp. 1187-1193, Dec. 8, 1991.

Mirtich, IEEE Intl. Conf. On Robotics and Automation, May 1998, Rigid Body Contact: Collision Detection, pp. 10-17.

Sinha, Pramath Raj; Abel, Jacob M.; "A Contact Stress Model for Multifingered Grasps of Rough Objects," Feb. 1992, IEEE Transactions on Robotics and Automation, vol. 8, No. 1.

Baraff, D.; "Interactive simulation of solid rigid bodies," IEEE Computer Graphics and Applications, vol. 15, Issue 3, May 1995.

Burden, Rihard, L.; Faires, J. Douglas; "Numerical Analysis," Fourth Edition, 1989, PWS-Kent Publishing Company.

Baraff D.; "Analytical Methods for Dynamic Simulation of Non-Penetrating Rigid Bodies," Computer Graphics, vol. 23, No. 3, Jul. 1989.

C. Lennerz, E.Schomer and T. Warken; "A framework for collision detection and response," 11th European Simulation Symposium and Exhibition (ESS'99), 1999.

Moreau, Jean J; Jean, Michel; "Numerical treatment of contact and friction: the contact dynamics method," The 1996 3rd Biennial Joint Conference on Engineering Systems Design and Analysis ESDA. Part 4 (of 9); Montpellier; Fr; Jul. 1-4, 1996

Anitescu M., "A Fixed Time Step Approach for Multi-Body Dynamics with Contact and Friction," *International Conference on Intelligent Robots and Systems IROS 2003*, vol. 3, pp. 3725-3731, 2003.

Anitescu M., "Modeling Rigid Multi Body Dynamics with Contact and Friction," Doctoral Thesis, University of Iowa, 1997.

Anitescu, M. and Potra F., "Formulating, Dynamic Multi-rigid-body Contact Problems with Friction as Solvable Linear Complementarity Problems," *Reports on Computational Mathematics*, No. 93/1996, Department of Mathematics, The University of Iowa, 1996.

Antiescu, M. and Hart, G.D., "Solving Nonconvex Problems of Multibody Dynamics with Contact and Small Friction by Successive Convex Relaxation," *Mechanics Based Design of Structures and Machines*, vol. 31, Issue 3, pp. 335-356, Jan. 2003.

Ascher, U.M. "Stabilization of Invariants of Discretized Differential Systems," *Numerical Algorithms*, vol. 14, No. 1-3, pp. 1-24, Apr. 1997.

Ascher, U.M., Chin, H., L.R. Petzold and Reich S, "Stabilization of Constrained Mechanical Systems with DAEs and Invariant Manifolds," *Numerische Mathematik*, vol. 67, No. 2, pp. 131-149, 1994.

Baraff, D., "Fast Contact Force Computation for Nonpenetrating Rigid Bodies," *SIGGRAPH 1994, Computer Graphics Proceedings*, pp. 23-34, 1994.

Baraff, D., "Non-Penetrating Rigid Body Simulation," *Eurographics 93 State of the Art Reports*, Barcelona, Sep. 6-10, 1993, Chapter 2.

Cline, M.B. "Rigid Simulation with Contact and Constraints," Master's thesis, University of British Columbia, Jul. 2002.

Cline, M.B. and Pai, D.K., "Post-Stabilization for Rigid Body Simulation with Contact and Constraints," *Proc. IEEE Intl. Conf. on Robotics and Automation*, 2003.

Keller H., Stolz, H., Ziegler, A. and Braunl T., "Virtual Mechanics Simulation and Animation of Rigid Body Systems: Aero," *Simulation*, vol. 65, No. 1, pp. 74-79, 1995.

Kry, P.G. and Pai D.K, "Continuous Contact Simulation for Smooth Surfaces," *ACM Transactions on Graphics*, vol. 22, Issue 1, pp. 106-129, 2003.

Kry, P.G., "Fast Contact Evolution for Piecewise Smooth Surfaces," MS Thesis, University of British Columbia, 2000.

Lin, S.T. and Huang, J.N., "Stabilization of Baumgarte's Method Using the Runge-Kutta Approach," Journal of Mechanical Design, vol. 124, No. 4, pp. 633-641, 2000.

Mirtich, B.V., "Impulse-based Dynamic Simulation of Rigid Body Systems," Doctoral Thesis, University of California at Berkeley, 1996.

Mirtich, B.V., "Timewarp Rigid Body Simulation," *Proceedings of the 27th International Conference on Computer Graphics and Interactive Techniques*, pp. 193-200, 2000.

Pai, D.K., Ascher, U.M. and Kry, P.G., "Forward Dynamics Algorithms for Multibody Chains and Contact," *International Conference on Robotics and Automation, ICRA 2000*, vol. 1, pp. 857-863.

Plante, E., Cani, M.-P., and Poulin P., "A Layered Wisp Model for Simulating Interactions inside Long Hair," *Eurographics Workshop on Computer Animation and Simulation*, pp. 139-148, 2001.

Sauer J. and Schoemer, E. "A Constraint-Based Approach to Rigid Body Dynamics for Virtual Reality Applications," *ACM Symposium on Virtual reality Software and Technology*, pp. 153-162, 1998.

Stewart, D. "Convergence of a Time-Stepping Scheme For Rigid Body Dynamics And Resolution Of Painlevé's Problem Summary," *Archive for Rational Mechanics and Analysis*, vol. 145, No. 3, pp. 215-260, 1998.

Stewart, D.E. and Trinkle J.C., "Dynamics, Friction, And Complementarity Problems," *Proceedings of the International Conference on Complementarity Problems*, Philadelphia PA, 1996, pp. 425-439.

Trinkle, J. Pang, J.S., Sudarsky, S., and Lo G., "On Dynamic Multi-Rigid-Body Contact Problems with Coulomb Friction," *Technical Report TR95-003*, Texas A&M University, 1995.

Moore et al., "*Collision Detection and Response for Computer Animation*," Aug. 1988, Computer Graphics, vol. 22, No. 4, pp. 289-298.

Stronge, "*Rigid Body Collisions with Friction*," 1990, Proceedings: Mathematical and Physical Sciences, vol. 431, No. 1881, pp. 169-181.

Wang et al. "*Dynamics of Rigid Bodies Undergoing Multiple Frictional Contacts*," 1992, Proceedings of the 1992 IEEE International Conference on Robotics and Automation, pp. 2764-2769.

* cited by examiner

METHOD AND APPARATUS FOR SIMULATING SOFT OBJECT MOVEMENT

INTRODUCTION

The invention relates to simulation of soft bodies for applications such as graphics animation for games and film post production.

Many computer applications can benefit greatly from enhancing environments with more complex behaviour. Areas from interactive entertainment, industrial simulation and mechanical simulation to surgical simulation or architectural planning all rely on a plausible representation of an environment to deliver their message effectively. One aspect of this plausibility is the movement of objects within these synthetic environments. To maintain the illusion of realness or to ensure the validity of experiment objects must behave as their counterparts in the real world would. In the physical world objects have dimension, weight, elasticity and friction; they bounce off each other or slide over each other etc. In the synthetic environment, the same must hold true. Various approaches have been developed to determine the interactions.

One problem in this domain is calculating the movements and interactions of objects that one assumes infinitely hard. The assumption of rigidity allows for some algebraic simplifications and this problem has been addressed with some measure of success in the past. The problem that is addressed in the present invention is the one of non-rigid dynamics.

The majority of approaches to flexible object dynamics revolve around decomposing the objects into a set of interconnected simple primitive elements. The dynamic behaviour of these individual elements can usually be modelled reasonably accurately by a simple equation or set of equations. The overall behaviour is then approximated by simultaneously solving these simple sub equations. This idea covers the two dominant techniques in the area, the Finite Element Method (FEM) and the Spring Mass approach (SM). The FEM uses a volumetric primitive while the SM approach uses point masses connected by springs in various sorts of lattice structures. Finite element formulations have been used to compute forces on tetrahedral and other volumetric elements [OBrien99]. The SM approach is suitable for the simulation of deformable surfaces (for example, cloth), using springs applying opposite forces on connected vertices.

The SM approach has been used to simulate the deformation of 3 dimensional solids in addition to surfaces, by increasing the connectivity of the point masses with extra springs. The problem with this approach is in maintaining the structural stability of the soft body (i.e. it should in general maintain a shape approximately similar to its original shape—and therefore not exhibit bad states like turning inside-out). Composing a soft body purely of springs does not give this necessary stability, as there will exist many stable "rest" states for the spring mass lattice that are not the original shape.

[Terz88b] describes use of a reference shape for simulation of a soft body in which the linear motion, the angular motion and the deforming motion are described. The simulation is in terms of rigid body dynamics. This approach is numerically expensive, involving solving three coupled differential equations for the continuum of the soft body solid. Using finite-difference or finite-element approximation techniques involves sampling the soft body solid through its volume, resulting in many points to simulate.

References

[Terzopoulos88b] Terzopoulos, D. and Witkin, A. "Physically based models with rigid and deformable components" IEEE Computer Graphics and Applications vol. 8 no. 6 (1988) November pp 41-51.

The invention is directed towards providing improved simulation of soft bodies.

STATEMENTS OF INVENTION

According to the invention, there is provided a method of simulating soft body movement in a data processing simulator, the method comprising the steps of:
defining the surface of a soft body as a mesh represented by a plurality of points in space connected by edges;
representing each point of the mesh with a point mass, the motion of which is governed by laws of motion; and
representing forces acting on the point masses with a combination of sets of corresponding pairs of:
skin forces connecting pairs of point masses, and
volumetric forces for maintaining relative positions of arbitrary sets of points, introducing no net linear or rotational forces on the soft body.

In one embodiment, a volumetric force component is determined by:
defining:
a reference shape, comprising a set of points in space that specify the rest state for the set of points affected by the volumetric force component,
a reference set that specifies a mapping between points in the soft body and points in the reference shape, and
a reference frame that determines the position and orientation of the reference shape in space;
determining the position and orientation of the reference frame as the points of the soft body move in space; and
determining a set of forces to apply to the point masses of the soft body such that the points tend to maintain the reference shape without introducing any net linear or rotational force about the centroid of the set of points.

In one embodiment, the points in a reference set are connected to form a surface whose connectivity is the basis for a set of skin forces tending to keep the points in place in the direction of the surface, such as a set of linear springs between points connected by edges of the surface, and include forces to maintain the local curvature of the surface.

In another embodiment, shape-restoring forces of a volumetric force component are calculated as a function of the relative positions between points in the soft body specified by the reference set and the corresponding points in the reference shape transformed by the reference frame.

In one embodiment, any net linear or rotational forces resulting from forces applied to a set of vertices of a volumetric force component are removed by a post-processing step based on the initial shape-restoring forces applied.

In another embodiment, the position and orientation of the reference frame of a force component is determined by examining incremental movement (i.e. the movement from one discrete state to the next, as the soft body is simulated) of the point masses of the soft body specified by the reference set.

In one embodiment, the position and orientation of the reference frame of a force component is determined by examining the absolute positions of the points of the soft body corresponding to the reference set of the force component.

In another embodiment, volume of the soft body is calculated and used to increase the volume preservation properties of a set of points represented by a volumetric force component.

In one embodiment, the reference shape of a force component may be altered to achieve plasticity in the volume defined by the set of points represented by the volumetric force component.

In a further embodiment, the reference shape of a force component may be altered externally to achieve a morphing behaviour over time for the soft body.

In one embodiment, the forces created by the force component provide anisotropic stiffness properties for the volume represented by a volumetric force component.

In another embodiment, the forces created by the volumetric force component are damped using the movement of the reference frame of the volumetric force component.

In a further embodiment, the force components may be combined to create compound soft bodies.

In one embodiment, the simulator uses static stiffness and damping parameters to control the change in mesh shape.

In another embodiment, the simulator determines current shape according to changes in shape, rotation, and movement in space.

According to another aspect, the invention provides a simulator comprising means for performing a method as defined above.

DETAILED DESCRIPTION OF THE INVENTION

The invention will be more clearly understood from the following description of some embodiments thereof, given by way of example only with reference to the accompanying drawings in which.

The invention is directed towards providing for improved simulation for soft bodies, by utilising the spring mass or other appropriate surface method in conjunction with a new volumetric force model which works with sets of points in space. A significant advance embodied in this invention is the fact that it works with arbitrary sets of points in space and is thus generally applicable over a wide range of problems. The volumetric force model works by applying forces to the point masses such that they tend to always return to a specified shape. The resulting soft body has only one stable rest state.

Figure 1:
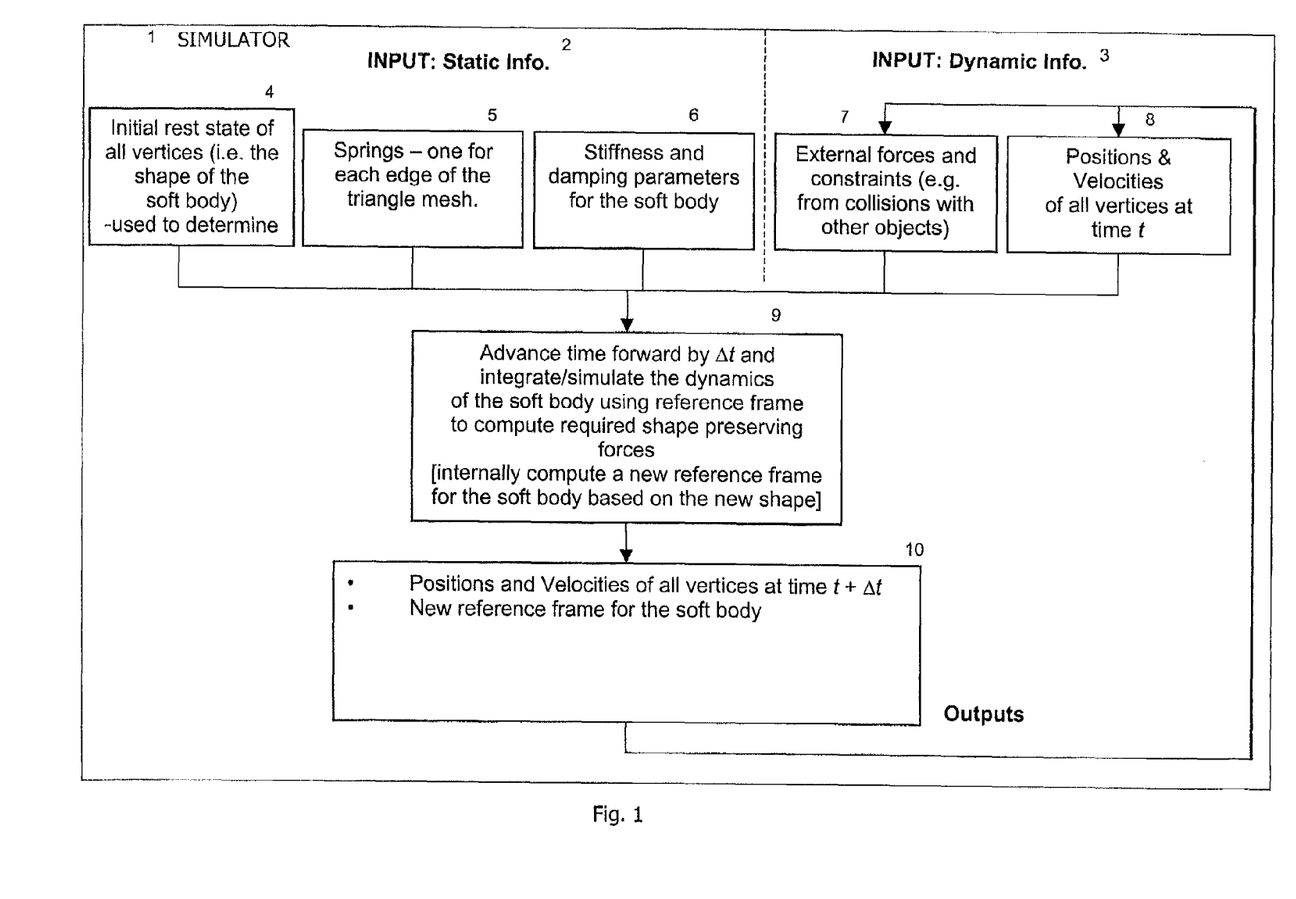
FIG. 1 is a high-level representation of operation of a simulator for soft body movement simulation.
Figure 2:
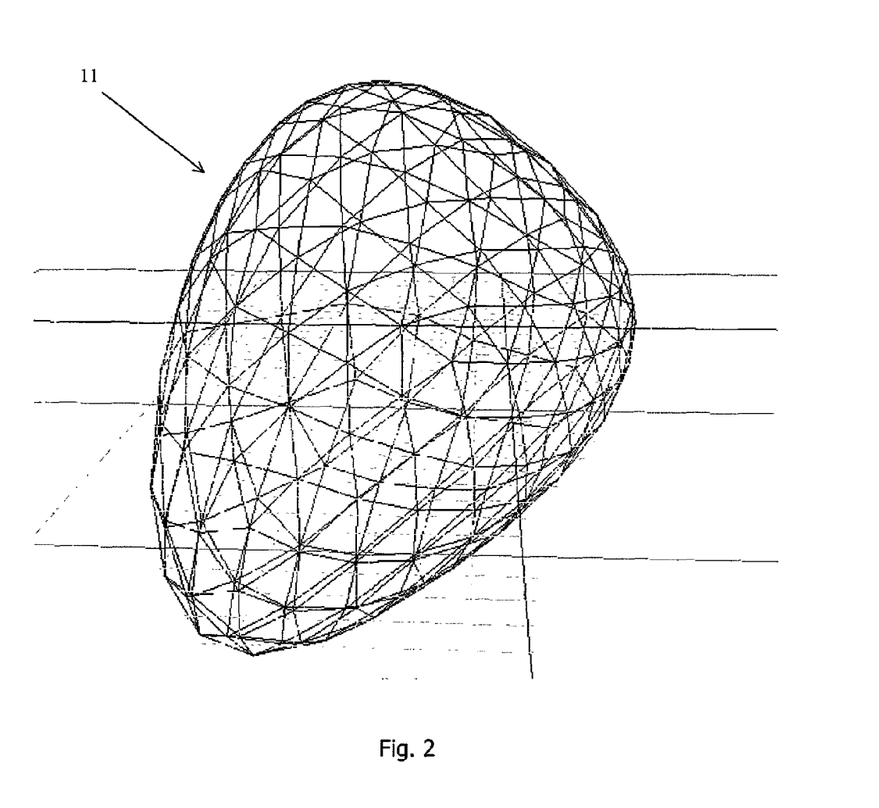
FIG. 2 is a diagram illustrating representation of a soft body.

Referring to FIG. 1, operation of a simulator 1 is illustrated at a high level. The input data is created from a description of the soft body in terms of static 2 and dynamic 3 information. A typical description can be derived from a closed triangular mesh 11 (for example as shown in FIG. 2) describing the initial shape of the soft body. The static information comprises an initial rest state of all vertices 4, springs 5—one for each edge of the triangle mesh and stiffness and damping parameters for the soft body 6. The simulator creates a soft body by creating a set of point masses, (one for each vertex of the triangular mesh) and a set of force components to act on these point masses. These force components describe how the point masses will tend to move when the body is deformed (the point masses are in a shape other than the initial shape). The dynamic information 3 comprises external forces and constraints 7 and positions and velocities of all vertices at time t, 8.

The force components are divided into two types—skin and volumetric force components. These can be thought of as performing different functions for returning the soft body to its original shape when deformed. The skin force component keeps the outside of the soft body stretching away from its original length. The simulation of the outside of the soft body is analogous to cloth simulation, and can be treated in the same way (c.f. [Baraff98]). The volumetric force component tries to keep the points of the soft body in the same shape as the original rest shape. If one side of the soft body is pushed in towards its centre, the volumetric force component will tend to push the body back to its original shape.

The skin force component can be created with a spring at each edge of the mesh, with a rest length equal to the initial length of the corresponding edge. A triangle-based force model [Baraff98] may alternatively be used.

A corresponding volumetric force component is created by storing the initial shape of the mesh as a reference shape for the force component.

A reference set is created which provides a mapping between positions in the reference shape and point masses in the physical model.

A reference frame is created which is used to transform the reference shape to the approximate position and orientation of the soft body as it is simulated. Initially the reference frame maps the points in the reference shape exactly to the points in the soft body. As the simulation progresses, the soft body deforms and no longer matches the reference shape exactly. The simulator maintains the approximate position and orientation of the reference frame by moving and rotating it incrementally, from one simulation step to the next.

The velocities and forces for the point masses in the soft body are set to the desired initial values (typically zero).

As shown in FIG. 1, the simulation 1 progresses in a discrete manner, progressing from one state to the next by simulating the system forward 9 a given amount of time, Δt. New positions and velocities 10 are calculated for each of the point masses in the soft body based on the positions and velocities of the point masses, and externally applied forces such as gravity. Structural forces—the skin and volumetric force components—are computed and applied to the point masses. These are based primarily on the positions of the point masses. The velocities of the point masses are also used to compute damping on the structural forces.

Figure 3:
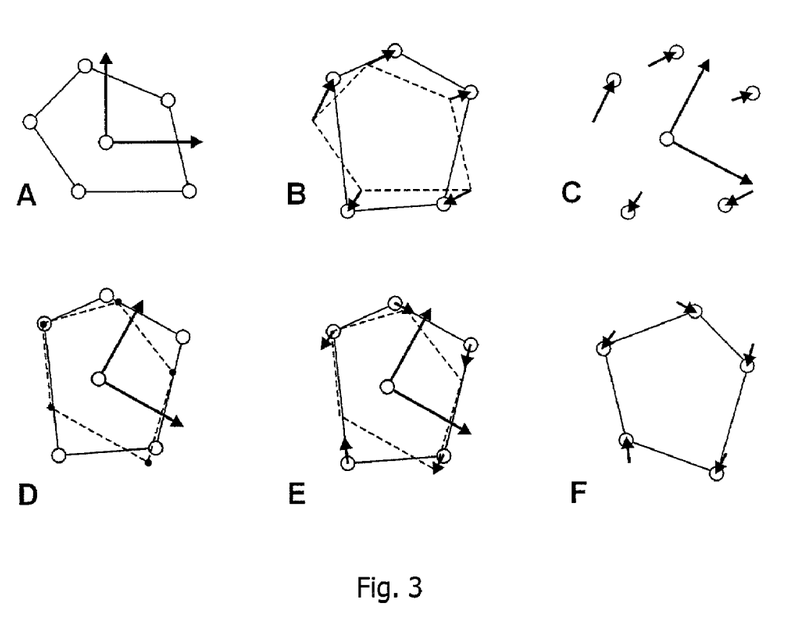
FIG. 3 is a set of two-dimensional diagrams illustrating simulation.

To illustrate the calculation of the structural forces in more detail reference is made to FIG. 3, which outlines the process in the 2D equivalent to a simple soft body with one volumetric force component:

A. Initial State: This represents the initial rest state of the soft body with the initial reference frame (i.e. the input to the system). Converting the edges of the original mesh to springs creates the skin force component. The volumetric force component is created by storing the initial shape of the mesh (called the reference shape of the force component). The reference frame is then set to the centroid of the mesh, with zero orientation. The rest state for the volumetric force component is the reference shape transformed by the reference frame— this means that the point masses of the soft body are thus initially in the rest state.

B. Simulate: At a given time in the simulation, many of the point masses of the soft body have moved from their original position, and the body is deformed to a new shape.

C. Get New Reference Frame: this new shape probably includes some rotational and translational components and not just pure deformation (i.e. under the influences of the external forces the object has both changed shape AND rotated AND moved in space). The simulator compares this new shape with the reference shape. To determine the position and orientation of the body, the simulator examines the movements of each of the point masses with respect to their previous positions and estimates the rotational and translation components for the body as a whole. It then applies this translation and rotation to the reference frame.

D. Compare Shapes: The simulator lines up the force component's reference shape with the corresponding points in the soft body by transforming it by the reference frame. The difference between the transformed reference shape and the soft body is a measure of the deformation of the body. The distance of each point in the soft body from its corresponding transformed reference shape point is a measure of the deformation of the soft body at that point. If it is assumed that the soft body will attempt normally to resume its original shape, the simulator needs to push the vertices back to the positions defined by the transformed reference shape.

E. Compute Shape Restoring Forces: Depending on the displacement of all the point masses from their original positions (and the soft body material parameters) the simulator computes forces to apply to each vertex to attempt to push it back towards its original position. In general this might introduce additional rotations and translations to the soft body (which are counteracted using methods described below).

F. Apply Shape Restoring Forces: The simulator applies the forces. After integration the soft body will assume a new shape, which is deformed, but where the deformation has been limited in a controllable manner. This process is then repeated, but the reference frame from this step is used as the initial reference frame for the next iteration of the simulation.

Figure 4:
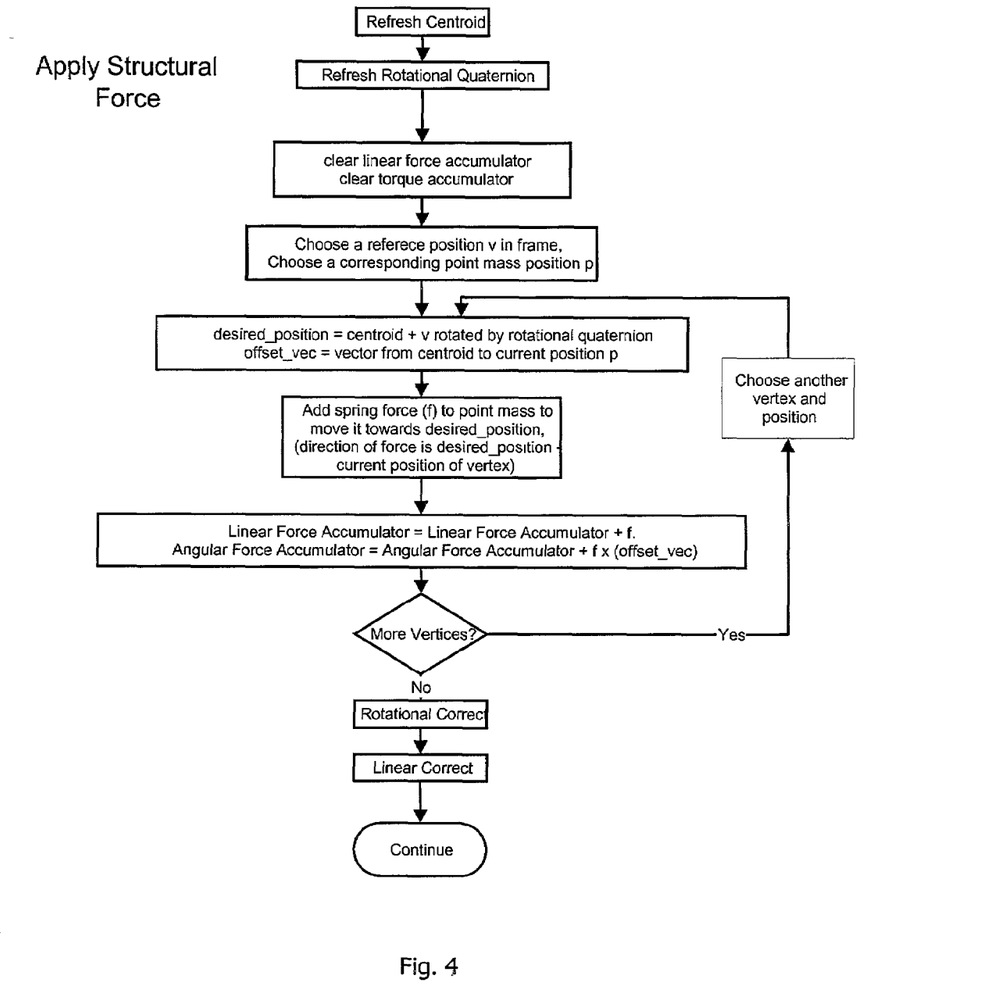
FIGS. 4 to 8 are flow diagrams illustrating simulation in more detail.

FIG. 4 is shows more detail of the process of the volumetric force component. First the position of the reference frame updated to the centroid of the point masses is determined. The reference frame orientation is then updated. Structural forces are then applied to the point masses based on the reference shape. After all structural forces have been applied the net torque is removed. The net linear force is then removed.

The invention provides an improved structural force formulation for point mass based soft bodies. As in traditional approaches, objects are described as triangular meshes, as shown in FIG. 3. A point mass is then placed at each of the n vertex positions of the original mesh (we denote the positions of point mass $m_i$ as $p_i$). Weights ($m_j$) are associated with each point mass by a simple division of the overall object weight by the number of point masses or in proportion to the triangular mesh area associated with each point mass or by any other appropriate method. A skin force component is created for the soft body. This can be done by using simple linear or quadratic springs to connect the surface mass points together, one being placed in general along each mesh edge. Alternatively, a triangle-based approach may be used [Baraff98].

A corresponding volumetric force component is created in the following way. A reference coordinate frame (or body space coordinate frame), and corresponding reference shape is next calculated for the object. The reference frame consists of a position ($p_{ref}$) in space, an orientation ($q_{ref}$), described using a quaternion. The reference shape consists of a list of n reference vectors ($v_i$) taken from the initial reference coordinate origin to the initial point mass positions. The initial position in space is taken as the centre of mass (or centroid) of the point masses. The orientation is initially chosen to be zero—such that the reference shape, when transformed by the reference frame will exactly match the start position of the soft body. As the reference coordinate frame position and orientation change the reference positions will always be taken relative to the updated reference frame position and orientation.

Integrating the soft body through time involves a number of processes. A process calculates the forces for the soft body given its deformation from the starting position. Given a set of forces ($f_{external_i}$) acting on the n point masses due to large-scale effects (e.g. gravity), collisions, and other user applied forces the simulator adds internal forces arising from skin and volumetric force components created as described above. Skin forces are applied by evaluating the springs or triangular elements. The volumetric force components are then evaluated. This process serves to add a structural force ($f_{struct_i}$) to each point mass, i, to maintain the body shape. These $f_{struct_i}$ are forces which correspond to zero-length springs acting between the current position of each point mass and the corresponding rest position for that mass point defined by the reference shape transformed by the current reference coordinate frame.

The rest position for point i will be:

$$p_{rest_i} = p_{ref} + q_{ref} v_i q^{-1}_{ref} \qquad \text{Equation 1}$$

The displacement vector from the actual point position to its undeformed rest position will be:

$$v_{disp_i} = p_i - p_{rest_i}$$

The simulator applies a force in the direction of this vector. If a simple zero length linear spring is used the force due to this displacement will be:

$$f_{struct_i} = m_i k_i v_{disp_i} \qquad \text{Equation 2}$$

where $k_i$ is a stiffness constant.

Other scalar functions of $v_{disp_i}$ could to determine the magnitude of the force to apply. In general we apply:

$$f_{struct_i} = m_i |v_{disp_i}| F(v_{disp_i}) \qquad \text{Equation 3}$$

Where $F(v_{disp_i})$ is a scalar function $v_{disp_i}$ such that $$\frac{d F(v_{disp_i})}{d |v_{disp_i}|} \geq 0 \qquad \text{Equation 4}$$

Using other functions $F(V_{disp_i})$ dependent on the direction of $v_{disp_i}$ (rather than just the length, as in the linear spring example above), the simulator obtains anisotropic stiffness properties for given areas of the soft body. Because unsymmetrical zero rest-length springs are used the overall system lacks the physically necessary force balance of Newton's 3rd Law; "For every action there is an equal and opposite re-action". It is therefore essential to balance both the linear and angular forces introduced by the structural forces. This is achieved by adding both the inverse of the average additional force and the inverse of the average additional torque to each point mass. To do this the simulator keeps track of the accumulated linear force and torque about the soft body centroid as it applies the structural forces. For each force, $f_{struct_i}$, it updates the accumulated linear force:

$$f_{linear} = \sum_i f_{struct_i} \qquad \text{Equation 5}$$

It also keeps track of the accumulated torque:

$$f_{rotation} = \sum_i f_{struct_i} \times (v_i - c) \qquad \text{Equation 6}$$

where $v_i$ is the position of vertex i, and c is the centroid of the soft body. The simulator is then able to remove the net torque and linear force from the soft body arising from any previously applied forces.

A method for removing this is to first remove the rotational component by applying appropriate forces to the point masses, adding these forces to the total linear force, $f_{linear}$, and then removing the linear forces in such a way as to apply no new rotational force.

Figure 5:
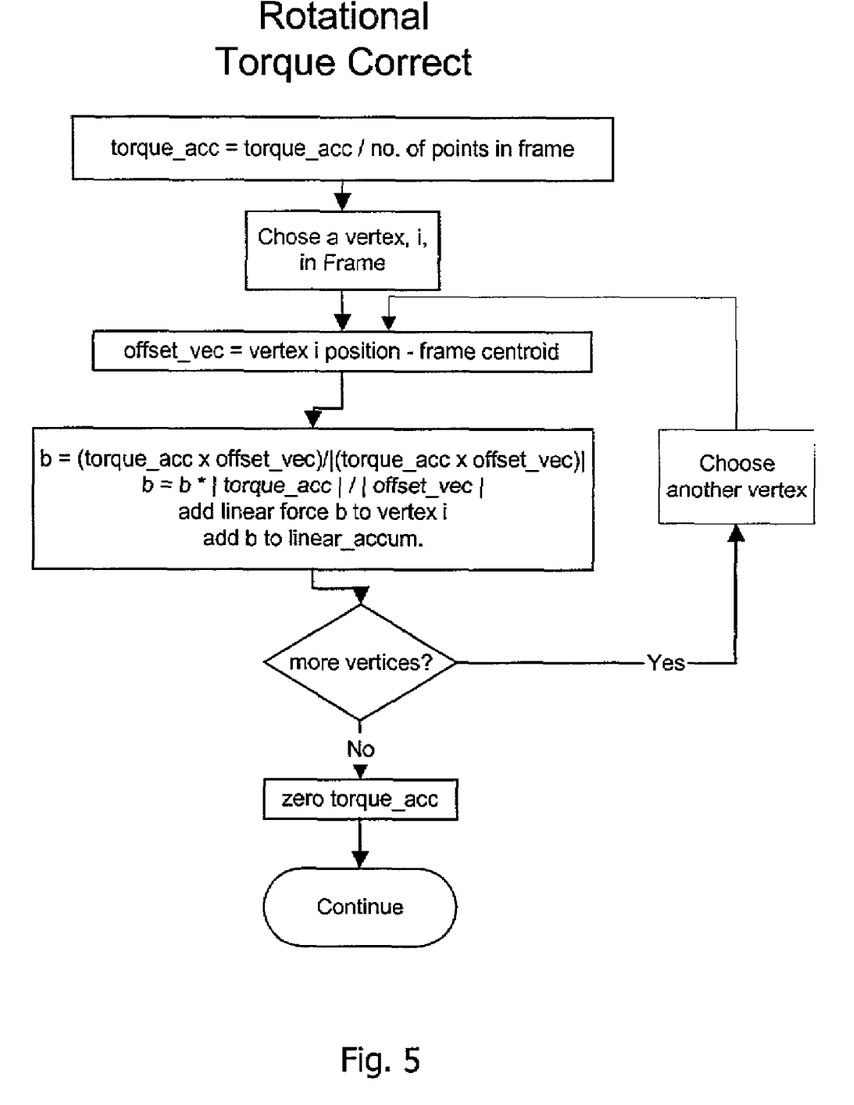

FIG. 5 illustrates a process to remove the rotational component of the forces. The total torque to remove, torque_acc, is divided by the number of point masses. For each point mass, a force is applied that creates the desired torque about the centroid of the point masses. Note that all forces applied during this process are added to the total linear force to remove, linear_accum.

Figure 6:
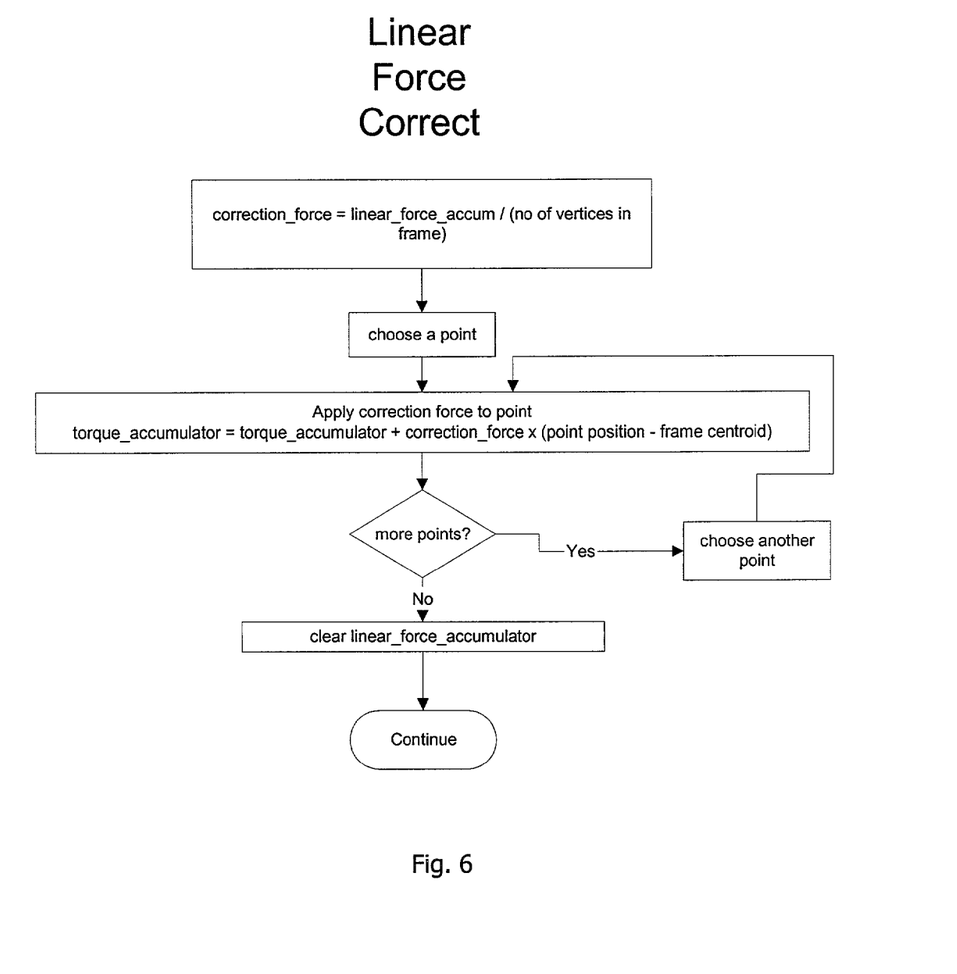

FIG. 6 illustrates a process to remove the linear component of the forces. The total linear force to remove is divided by the number of point masses. This force is then simply directly applied to all the point masses. This does not introduce any new torque, and at the end of this process all structural forces will be balanced.

The final force on particle i is now:

$$f_{final_i} = f_{external_i} + f'_{struct_i} \qquad \text{Equation 7}$$

The set of point masses are now integrated forward in time using any of the standard explicit or implicit numerical integration approaches (e.g. Euler, Mid point, Runge Kutta etc.).

The simulator then calculates the new reference coordinate frame after the point masses have been integrated forward in time.

Figure 7:
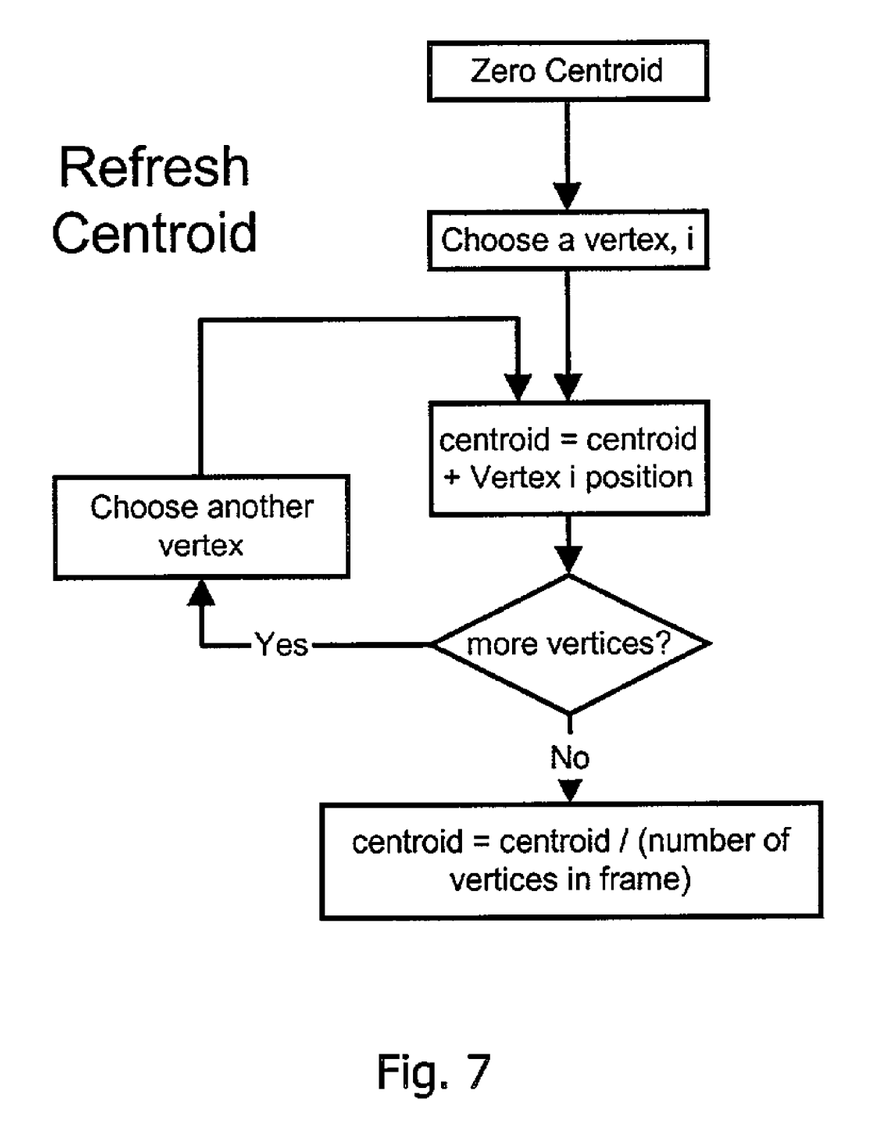

The new position of the reference coordinate frame is again taken from the centre of mass (or centroid) of the point mass cloud. This process is illustrated in FIG. 7. The change in orientation of the reference coordinate frame is chosen to be the average of the rotations that move each point mass from its current position to its current rest position as given by the updated reference frame.

$$\left. \begin{array}{l} v'_i = p_i - p_{ref} \\ \theta_i = \cos^{-1}\left(\dfrac{v_i \cdot v'_i}{|v_i||v'_i|}\right) \\ r = \left(\dfrac{v_i \times v'_i}{|v_i \times v'_i|}\right) \\ q_i = \left(\cos\dfrac{\theta_i}{2}, \sin\dfrac{\theta_i}{2}r\right) \\ q'_{ref} = q_{ref}\left(\dfrac{\sum_n q_i}{n}\right) \\ q_{ref} = \dfrac{q'_{ref}}{|q'_{ref}|} \end{array} \right\} \qquad \text{Equation 8}$$

Figure 8:
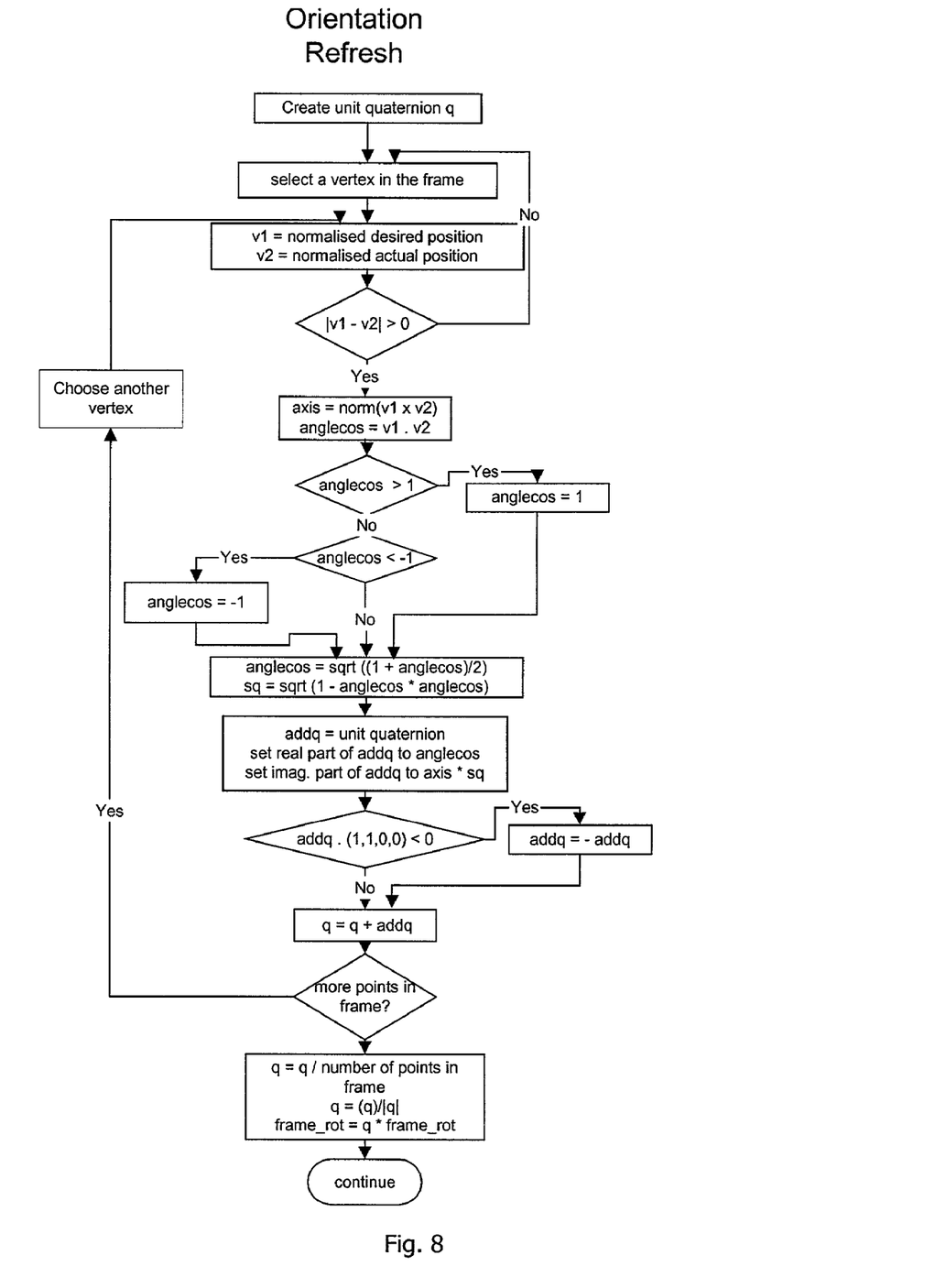

The application of Equation 8 is illustrated in FIG. 8. For each point mass specified by the reference set, the simulator calculates a quaternion corresponding to the rotation from its position in space to the corresponding "rest" position specified by the reference frame. These quaternions are added together and normalised to create an approximate average quaternion for the rotation of the soft body. This averaging process is analogous to the averaging of points on the surface a 3D sphere by taking the centroid of the points and projecting it onto the surface of the sphere. As two quaternions directly opposite each other specify the same rotation, we check that all quaterions are on the same side of the 4D sphere before averaging.

This change in orientation is an approximation to the new orientation of the set of points. During simulation, where the soft body rotates a small amount from one state to the next (over a typically small timestep), this approximation is sufficient. However if the soft body experiences a sudden large rotation, such as a user explicitly setting the rotation of the body in space, the simulator can obtain the correct orientation for the reference frames of the force components by iterating this rotation update several times, until the change in rotation of the reference frame becomes sufficiently small.

Multiple sets of skin/volumetric force components may be used to simulate one connected soft body. To achieve this, the simulator defines multiple surfaces from the points comprised in the soft body. For each surface, a skin force component and a corresponding volumetric force component is created. An example of this is a cubic lattice with point masses at the corners of the lattice, where the boundary of each cube represents a surface, and is used to create a skin and volumetric force component pair for the body.

Improved volume preservation can be achieved for the soft body by varying the rest state of the soft body as the simulation progresses. In the soft body model described here, the reference shapes of the volumetric force components and the rest lengths of the skin force components describe the rest state for the body. An example of this technique is to continuously measure the volume of the soft body, comparing its volume with the desired initial volume of the body. When the current volume is smaller than the desired volume, the size of the rest state is increased. When the current volume is larger than the desired volume, the size of the rest state is decreased.

Soft body plasticity can also be simulated using the described techniques, by varying the rest state of the soft body in the manner described above. While maintaining the volume in the method described above, the reference shape of the volumetric force component can be altered based on the current deformation of the soft body. The rest lengths of the elements of the skin force component are modified accordingly. An example of this is to move the points of the reference shape in and out along a straight line from the origin, based on the position of the corresponding points in the soft body. For instance if a point in a soft body has moved a distance x closer to the centroid of the soft body than the reference shape determines is its rest state, the corresponding reference shape point can be moved a distance closer to the origin based on x.

It is also possible to achieve a morphing behaviour for a soft body simulated with the described techniques. We define a morphing function over time, such that at each point in time, the function describes a new rest state for the soft body. By changing the volumetric and skin force components of the soft body to match the rest state specified by the morphing function, the soft body will morph in the desired way.

It will be appreciated that the invention use the mesh (reference shape) to provide a shape-restoring force. Position and orientation are instantaneously calculated from the positions of the simulated points. The shape restoring force provided by the reference shape avoids the need to simulate any "inner" points. Rather, the body is simulated as the set of position on the surface using standard point mass processing techniques.

The invention is not limited to the embodiments described but may be varied in construction and detail.

The invention claimed is:

1. A method of simulating soft body movement in a data processing simulator, the method comprising the steps of:
   defining the surface of a soft body as a closed mesh represented by a plurality of points in space connected by edges, such that no edges are defined within the surface of the soft body;
   representing each point of the mesh with a point mass, the motion of which is governed by laws of motion;
   representing forces acting on the point masses with a combination of sets of corresponding pairs of:
      skin forces connecting pairs of point masses, and
      volumetric forces for maintaining relative positions of arbitrary sets of points,
   introducing no net linear or rotational forces on the soft body; and simulating the movement of the soft body;
   wherein a volumetric force component is determined by defining:
      a reference shape, comprising a set of points in space that specify the rest state for the set of points affected by the volumetric force component,
      a reference set that specifies a mapping between points in the soft body and points in the reference shape, and
      a reference frame that determines the position and orientation of the reference shape in space;
      determining the position and orientation of the reference frame as the points of the soft body move in space; and
      determining a set of forces to apply to the point masses of the soft body such that the points tend to maintain the reference shape without introducing any net linear or rotational force about the centroid of the set of points; and
   wherein shape-restoring forces of a volumetric force component are calculated as a function of the relative positions between points in the soft body specified by the reference set and the corresponding points in the reference shape transformed by the reference frame.

2. The method as claimed of claim 1, wherein the points in a reference set are connected to form a surface whose connectivity is the basis for a set of skin forces tending to keep the points in place in the direction of the surface, and to maintain local curvature of the surface of said skin forces including a set of linear springs between points connected by edges of the surface.

3. The method as claimed in claim 2, wherein any net linear or rotational forces resulting from forces applied to a set of vertices of a volumetric force component are removed by a post-processing step based on the initial shape-restoring forces applied.

4. The method as claimed in claim 1, wherein the position and orientation of the reference frame of a force component is determined by examining incremental movement from one discrete state to the next, as the soft body is simulated, of the point masses of the soft body specified by the reference set.

5. The method as claimed in claim 1, wherein the position and orientation of the reference frame of a force component is determined by examining the absolute positions of the points of the soft body corresponding to the reference set of the force component.

6. The method as claimed in claim 1, wherein the soft body has a single stable rest state.

7. The method as claimed in claim 1, wherein the reference shape of a force component may be altered to achieve plasticity in the volume defined by the set of points represented by the volumetric force component.

8. The method as claimed in claim 1, wherein the reference shape of a force component may be altered externally to achieve a morphing behavior over time for the soft body.

9. The method as claimed in claim 1, wherein the forces created by the force component provide anisotropic stiffness properties for the volume represented by a volumetric force component.

10. The method as claimed in claim 1, wherein the forces created by the volumetric force component are damped using the movement of the reference frame of the volumetric force component.

11. The method as claimed in claim 1, wherein the force components may be combined to create compound soft bodies.

12. The method as claimed in claim 1, wherein the simulator uses static stiffness and damping parameters to control the change in mesh shape.

13. The method as claimed in claim 1, wherein the simulator determines current shape according to changes in shape, rotation, and movement in space.

14. A computer program product comprising a computer readable medium with software code for performing the steps in claim 1 when executing on a digital computer.

15. A method of simulating changes to a soft body having a closed surface such that no edges are defined within the surface of the soft body, the surface comprising a plurality of points, the surface enclosing a first volume, the method comprising the steps of:
   representing each point on the surface with a point mass, the motion of each point governed by laws of motion;
   defining a set of skin forces, the skin forces acting on the surface;
   defining a set of volumetric forces for maintaining a soft body shape defined by the surface;
   representing forces acting on the point masses with the sets of volumetric forces and skin forces; and
   simulating changes to the soft body shape, wherein the first volume only comprises points on the surface, wherein a volumetric force component is determined by: a reference shape, comprising a set of points in space that specify the rest state for the set of points affected by the volumetric force component, a reference set that specifies a mapping between points in the soft body and points in the reference shape, and a reference frame that determines the position and orientation of the reference shape in space.

16. The method of claim 15 wherein the first volume and the surface define a reference shape associated with a single stable rest state.

17. The method of claim 15 wherein each volumetric force is calculated using a centroid based method comprising:
   calculating an initial shape of the soft body using a centroid of the soft body as a reference frame;
   determining changes in a position of points on the surface of the soft body using the reference frame; and
   applying shape restoring forces to control deformation of the soft body.

18. A method of simulating soft body having a closed surface such that no edges are defined within the surface of the soft body, in a data processing simulator, the method comprising the steps of:
   representing each point on the surface with a point mass, the motion of each point governed by laws of motion;
   representing forces acting on the point masses with a set of volumetric forces and a set of skin forces;
   simulating soft body movement between a rest state and a deformed shape;
   continuously measuring a volume of the soft body;
   comparing the volume with a desired volume of the soft body;
   increasing size of the rest state, when the volume is smaller than the desired volume; and
   decreasing size of the rest state, when the current volume is larger than the desired volume, wherein a volumetric force component is determined by: a reference shape, comprising a set of points in space that specify the rest state for the set of points affected by the volumetric force component, a reference set that specifies a mapping between points in the soft body and points in the reference shape, and a reference frame that determines the position and orientation of the reference shape in space.

* * * * *